Nov. 2, 1954 — L. C. PRATT — 2,693,541
PORTABLE ELECTRIC MOTOR FOR HAND DRILLS
Filed June 9, 1953
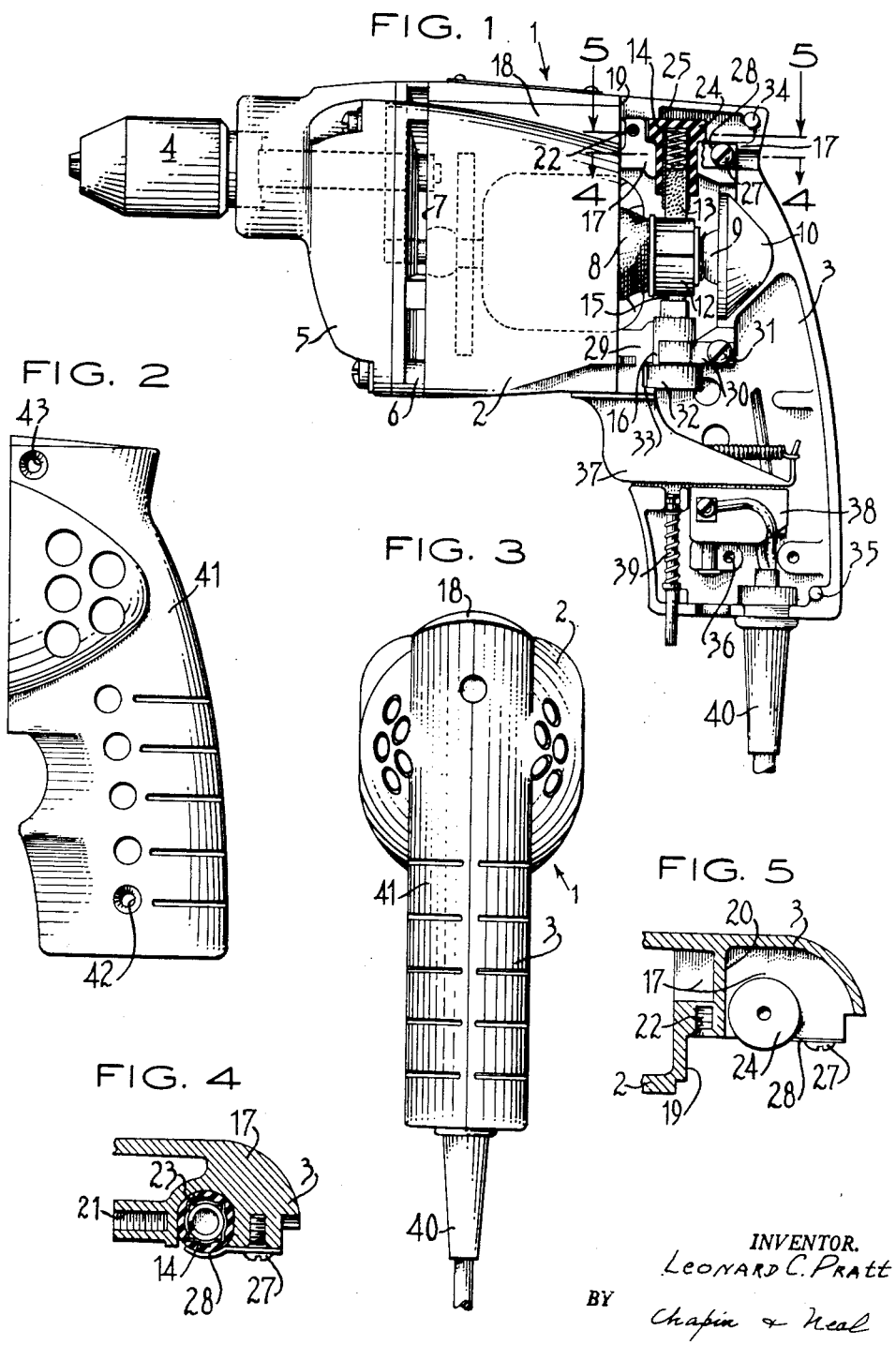
INVENTOR.
Leonard C. Pratt
BY Chapin & Neal

United States Patent Office 2,693,541
Patented Nov. 2, 1954

2,693,541

PORTABLE ELECTRIC MOTOR FOR HAND DRILLS

Leonard C. Pratt, Greenfield, Mass., assignor to Millers Falls Company, Greenfield, Mass., a corporation of Massachusetts Application June 9, 1953, Serial No. 360,449

6 Claims. (Cl. 310—50)

This invention relates to electrically driven hand portable tools and more particularly to hand tools of the pistol grip type such as electric drills and the like, and has for an object provision for a novel casing frame construction and brush holder mounting means in combination therewith for rendering the brushes and holders therefor more accessible for purposes of economical assembly, inspection, maintenance and repair.

Another object is to provide a frame mounting structure for the brush holders of the motor which will enable the use of a more economically constructed brush holder and a more economically formed casing frame.

These and additional objects and advantages will be apparent from the following description of an embodiment of the invention as shown by the accompanying drawings in which:

Fig. 1 is a side elevation of a tool with the handle cover shell removed and showing brush holder units mounted in the assembly;

Fig. 2 is a side elevation of the handle cover shell member;

Fig. 3 is an end view from the rear of the tool with the handle cover shell mounted on the frame assembly shown by Fig. 1;

Fig. 4 is a section on line 4—4 of Fig. 1; and

Fig. 5 is a section on line 5—5 of Fig. 1.

In general the principal objects of the invention are carried out by providing a motor carrying casing frame member comprising a forward section in the form of a generally tubular or cylindrical housing shell in which the main body of the motor is mounted and a split shell section integral therewith extending rearwardly and in depending relation to the cylindrical section and forming one half of a handle portion of the tool. The inner face of the split rear section is exposed and on this portion the switch means, the rear bearing mount, and motor brushes are mounted in fixed assembled position. A separable handle cover shell is adapted to mate with the exposed rear split section of the frame and form therewith a hollow pistol grip portion for the tool. The handle portion as is common in this type of tool extends in generally right angular relation to the axis of the cylindrical shell section.

The split rear section of the frame member is also adapted to hold the commutator of the motor in exposed position and at opposite sides thereof are formed U-shaped web supports integral with the handle shell portion with clip means retaining the motor brush holders fixed in mounted operative position in the assembly.

With reference to the drawings for details of an embodiment of the invention the frame member is generally designated by the numeral 1, the forward cylindrical shell portion 2 substantially encasing the motor with an integral longitudinally split half handle portion extending therefrom at 3 with its inner face lying entirely exposed. As shown section 3 extends in transversely disposed relation at the rear end of the cylindrically formed shell. The cylindrical shell 2 is adapted to carry an electric motor furnishing power for rotation of the chuck 4 at the outer end of the drill. A gear case 5 and a separator 6 in which air intake ports 7 are provided, are fixed to the front end of the shell 2. The shaft of the armature 8 of the motor which is mounted in the casing frame extends from the gear case, where the shaft meshes with a spindle gear for lateral offset driving of the spindle, to the rear exposed section 3, being there mounted in a bearing 9 carried in a cup 10 integrally formed at the rearward side of section 3. The commutator 12 of the motor is located between bearing 9 and armature 8, and in the upper part of the casing 3 above the commutator a brush 13 for the motor is carried in a holder 14. In the casing 3 below the commutator a brush 15 is mounted in a holder 16.

For mounting the holder 14 the split shell portion 3 is provided with an integrally formed fin or web 17 (Figs. 4 and 5) extending across the upper section thereof from the rear edge above the cup 10 (Fig. 1) to the upper rear portion of the cylindrical shell 2. As may be noted from Fig. 1 the forward cylindrical shell of the frame is formed with an upper hood portion as at 18, the flattened sides of which extend forwardly across the top of the shell. The front end edge of web 17 is thus in diametrically inwardly spaced relation to the upper rear edge of the shell 2 and at the rear top edge of the hood an integral vertical connector wall as at 19 (Fig. 5) is provided with which the web 17 is integrally connected at its forward corner edge. The web 17 extends integrally from the side wall of shell 3 and is also braced by a vertical reinforcing rib 20 extending to the top wall of the shell.

The web 17 serves as a U-shaped support for mounting the brush holder 14. It also serves to provide a support in which a threaded mounting 21 (Fig. 4) may be located for an upper motor mounting screw (not shown) and the support for a threaded mounting for a handle cover shell mounting screw as at 22 (Figs. 1 and 5).

The central portion of the web 17 is thickened in the area of a U-shaped recessed portion at 23 (Fig. 4) and is provided to receive in the sides thereof the flattened sides of brush holder 14 as shown. An enlarged cap or head 24 (Figs. 1 and 5) of the holder provides a shouldered outer end extending above the web 17 into an open pocket formed by the web 17 and the upper edge of shell 3. At the forward end of the pocket a lip at 25 extends from the connecting portion 19 to overlie the web 17 and abut the top edge of the head 24 so as to receive the same when the brush holder 14 is seated in its recess. Thus the holder will drop into proper registration for fixing in the assembly with no further adjustment. At the rearward side of the recess 23 in the edge of the web a threaded opening is provided for mounting a retainer screw 27 in the end of a retainer band clip 28 having its free end extending across the upper side of holder 14 and clamping the same in the recess.

Brush holder 16 is oppositely mounted in a lower fin or web 29 parallel to web 17 and extending outwardly of the side wall of shell 3 from below bearing cup 10 forwardly to the lower rear edge portion of the cylindrical shell 2. Web 29 is likewise U-shaped forming a brush holder recess in alignment with the upper recess of web 17 for mounting the holder 16 by a retaining band clip 30 secured by the mounting screw at 31. The web 29 is formed with an integral connecting portion to the lower edge of cylindrical shell 2 and a lip extension 33 spaced below the forward edge of web 29 serves to overlie the adjacent edge of the shouldered cap 32 of holder 16 when the holder is inserted in its recess.

In Fig. 1 mounting lugs 34 and 35 for mating with suitable recesses in the cover shell for the handle are shown with a lower cover mounting screw opening indicated at 36. A trigger 37 is shown exposed on the lower face of shell portion 3 with a switch at 38. A conventional spring controlled switch lock is provided at 39 with the connector cord for the drill at 40 fitted in the lower edge of the split shell.

It will be understood that any suitable wiring connections may be made to the brushes as shown herein. The cap construction of the brush holders moreover may be integrally formed as shown since the entire brush holder unit can be readily removed by detaching the clips 28 and 30 for replacement of a worn brush or defective spring element or for the replacement of the entire brush and holder unit in the assembly.

In the initial assembly or for later inspection it will be seen that the entire mechanism located at the rear of the drill may be fixed in proper position to lie conveniently and fully exposed for testing and inspection purposes, the final step in the assembly being merely to mate the handle cover shell 41 shown by Fig. 2 over the frame section 3, registering the mounting holes 42 and 43 therein with openings 22 and 36, and suitably securing the same.

What is claimed is:

1. In a hand portable electric tool a motor casing frame provided with a cylindrical shell portion and a split handle portion integral therewith, said split handle portion including opposed supports having open U-shaped recesses adapted to receive motor brush holders therein and means to retain said brush holders in said recesses, and a second shell member mating with said split handle portion and forming therewith a hand grip for said tool.

2. In a hand portable electric tool, a motor casing frame provided with a forward cylindrical shell portion and a half handle portion integral therewith extending in right angular rearwardly disposed relation thereto, said handle portion including upper and lower opposed supports having open U-shaped recesses adapted to receive motor brush holders therein, a forwardly facing bearing cup between said supports at the rear ends thereof, and means on said supports to retain brush holders in said recesses, and a cover member mating with said half handle portion and removably fixed thereto for forming a hand grip for said tool.

3. In a hand portable electric tool a motor casing frame provided with a forward cylindrical housing shell and a split handle portion integral therewith lying in rearwardly disposed right angular relationship to said forward housing, said handle portion including upper and lower parallel supports integrally formed thereon and extending from adjacent the upper and lower rear end edges of said cylindrical shell with opposite axially aligned open U-shaped recesses adapted to receive motor brush holders therein, a removable retainer clip fixed at one end thereof on the edge of each support adjacent a recess with the other end of the clip overlying the recess to clamp a brush holder unit therein, and a handle cover shell mating with said handle portion and removably fixed thereto to form a hand grip for said tool.

4. In a hand portable electric tool, a motor casing frame provided with a cylindrical forward housing shell and a longitudinally split half handle shell portion integral therewith and extending in right angular rearwardly disposed relation to said forward cylindrical portion, said split shell portion including a bearing cup adjacent its rear wall axially facing said cylindrical shell in rearwardly spaced relation, parallel spaced brush holder supporting webs extending from above and below said cup forwardly thereof to the forward edge of said handle portion, the upper web being in spaced relation to the upper edge of said handle portion and the forward edges of said webs being in diametrically inwardly spaced offset relation to said upper and lower edges at the rear end of said cylindrical shell, and connecting portions integrally joining the adjacent web end with the said upper and lower rear cylindrical shell edges, said webs at the inner lateral edges thereof having diametrically aligned open U-shaped recessed portions with retaining clip members overlying said recesses with one end of said members being removably fixed adjacent the edge of said recesses for clamping motor brush holder units therein, said handle portion above and below said webs forming therewith open pockets to receive the outer ends of said brush holders with said connecting portions at the front ends of the webs having rearwardly directed extensions overlying in spaced relation the edge portions of said webs adjacent the inner end of the recesses for abutting the capped head of a brush holder adapted to be inserted in the recess, and a handle cover shell removably mated with said handle portion and forming therewith a hollow hand grip for said tool.

5. In a hand portable electric tool a motor casing frame provided with a forward cylindrical shell and a longitudinally split half handle portion extending integrally therefrom, a motor mounted in the cylindrical shell and a motor shaft extending across the inner face of said split portion, mounting means formed in said handle portion supporting the end of said shaft in spaced relation to the rear end of said cylindrical shell and a commutator on said shaft lying exposed on the face of said handle portion, said handle portion including upper and lower brush holder web supports extending across the face thereof and formed with open, aligned recessed portions in adjacent relation above and below said commutator, brush holders mounted in the recesses carrying brush elements held against opposite sides of the commutator with holder retaining clips removably fixed at one end adjacent the open sides of said recesses and having the free ends thereof clamped in overlying position against said holder, said holders having integral shouldered cap portions extending from the outer ends of said recesses, and a handle cover shell removably mated with said split handle portion and forming a hollow hand grip for said tool.

6. The structure of claim 5 in which said web supports at their front end edges are spaced in offset relation to the adjacent upper and lower edges of the cylindrical shell and integral connecting portions are provided therebetween at the rear side of which projecting lips extend to overlap the adjacent top edge surfaces of said brush holders in abutting relation thereto.

References Cited in the file of this patent
UNITED STATES PATENTS

| Number | Name | Date |
|---|---|---|
| 1,702,742 | Moretti | Feb. 19, 1929 |
| 1,965,669 | Robb | July 10, 1934 |